United States Patent
Tsai

(10) Patent No.: US 6,795,883 B2
(45) Date of Patent: Sep. 21, 2004

(54) METHOD AND SYSTEM FOR DIVIDING CONFIGURATION SPACE

(75) Inventor: Chau-Chad Tsai, Taipei (TW)

(73) Assignee: Via Technologies, Inc., Taipei Hsien (TW)

(*) Notice: Subject to any disclaimer, the term of this patent is extended or adjusted under 35 U.S.C. 154(b) by 413 days.

(21) Appl. No.: 10/055,500

(22) Filed: Jan. 22, 2002

(65) Prior Publication Data

US 2002/0147868 A1 Oct. 10, 2002

(30) Foreign Application Priority Data

Apr. 4, 2001 (TW) .................................. 90108178 A

(51) Int. Cl.⁷ .............................................. G06F 9/00
(52) U.S. Cl. ........................................ 710/104; 713/100
(58) Field of Search ............................. 710/8–10, 104; 713/1–100

(56) References Cited

U.S. PATENT DOCUMENTS

| | | | | |
|---|---|---|---|---|
| 6,119,192 A | * | 9/2000 | Kao et al. ................... 710/311 |
| 6,241,400 B1 | * | 6/2001 | Melo et al. ................. 710/313 |
| 6,253,304 B1 | * | 6/2001 | Hewitt et al. ................. 712/6 |
| 6,516,375 B1 | * | 2/2003 | Ajanovic et al. ........... 710/305 |
| 6,564,280 B1 | * | 5/2003 | Walsh ........................ 710/305 |

* cited by examiner

Primary Examiner—Paul R. Myers
(74) Attorney, Agent, or Firm—J.C. Patents

(57) ABSTRACT

A method of distribution and storage for a configuration space that may be applied to an advanced computer system without modifying the BIOS or system software used in a conventional computer system. To the microprocessor, it seems that all the configuration data are still stored in the north bridge control chip. But in fact, some configuration values related to a PCI bus are stored in a south bridge control chip. The design can conceal the effect caused by quoting a high speed private bus, and meet the requirement of dividing the configuration space for the advanced system.

13 Claims, 3 Drawing Sheets

METHOD AND SYSTEM FOR DIVIDING CONFIGURATION SPACE

CROSS-REFERENCE TO RELATED APPLICATION

This application claims the priority benefit of Taiwan application serial no. 90108178, filed on Apr. 4, 2001.

BACKGROUND OF THE INVENTION

1. Field of the Invention

The invention relates in general to a design of configuration space. More particularly, the invention relates to a method of dividing a configuration space.

2. Description of the Related Art

A north bridge control chip and a south bridge control chip normally exist in a conventional computer system using the PCI bus. FIG. 1 shows a conventional PCI bus system structure and the distributed locations of the configuration spaces thereof. In FIG. 1, in a PCI bus system, a north bridge control chip 100 comprises a configuration space for host bridge 160. The configuration values of the microprocessor 110, the memory system 150 and the PCI bus 120 are stored in the registers of the configuration space for host bridge 160. Similarly, the south bridge control chip 130 comprises a configuration space for the ISA bridge 190 to store the configuration values required by the peripherals connected to the south bridge control chip. In FIG. 1, the north bridge control chip 100 is responsible for connecting the microprocessor 110 and a 33 MHz PCI bus 120, while the south bridge control chip 130 is responsible for connecting the peripherals such as the USB controller and the IDE controller to the 33 MHz PCI bus 120. A LAN controller may also use the 33 MHz PCI bus to connect a memory system such as a DRAM. As the transmission speed of the memory bus and the peripherals is increased, a bottleneck of data transmission speed falls on the PCI bus with only a speed of 33 MHz.

SUMMARY OF THE INVENTION

The invention provides a method of distribution and storage of a configuration space that can be applied to an advanced computer system without modifying the BIOS or system software used in the conventional computer system. That is, for the BIOS or OS system development, the advanced computer system does not have any change in the access method and structure of configuration.

A method of dividing a configuration space is provided by the invention. The method can be applied to a computer system using a PCI bus, especially to an advanced computer system that quotes a high speed private bus between a north bridge control chip and a south bridge control chip. The computer system comprises a microprocessor, a host bus, the north bridge control chip, the high speed private bus, a PCI bus, the south bridge control chip, a memory bus, and a memory system. The host bus connects the microprocessor to the north bridge control chip. The high speed private bus is responsible for connecting the north bridge control chip to the south bridge control chip. Using the south bridge control chip, the PCI bus is connected to the host bus or the memory bus via the high speed private bus. The method provides an actual configuration space A stored in the north bridge control chip to store the configuration value relating to the microprocessor and the memory system. The method also provides an actual configuration storage space B in the south bridge control chip to store the configuration value relating to the PCI bus. In addition, the method provides a duplicated copy of configuration storage space B(A) in the north bridge control chip (south bridge control chip). Such duplicated copy of configuration storage space is an empty configuration space. The method further provides a selector in the north bridge control chip to select data to be read according to the specific requirement.

When the microprocessor intends to perform an operation of writing a configuration value, and if the data is to be written into the actual storage configuration space A of the north bridge control chip, the north bridge control chip executes the write operation. Meanwhile, the north bridge control chip also informs the south bridge control chip that the data is written into the duplicated copy of configuration space A of the south bridge control chip. If the data is written into the actual configuration storage space B of the south bridge control chip, in addition to send the write request to the south bridge control chip, the north bridge control chip also executes a write operation on the duplicated copy of configuration space B of the north bridge control chip. If the microprocessor is to perform a read operation on the configuration data, the read request is sent to both the north and south bridge control chips. Meanwhile, according to the read address, the selector located in the north bridge control chip determines such data is obtained from either the actual configuration space A of the north bridge control chip, or the actual configuration space B of the south bridge control chip.

Thus, to the microprocessor, it seems that all the configuration data are stored in the north bridge control chip. But actually, some configuration values related to the PCI bus are stored in the south bridge control chip. The design can conceal the influence caused by the quotation of a high speed private bus in the advanced computer system, but meet the requirement of dividing the configuration space distribution in the advanced system.

For the BIOS or OS system, the configuration space is equivalently undivided such that the original software program does not have to be modified correspondingly. But in fact, the configuration space is stored in the north bridge control chip and the south bridge control chip according to the specific requirement, respectively. The advanced computer system can thus quote a high speed private bus between the north and south bridge control chips to enhance the transmission functions.

Both the foregoing general description and the following detailed description are exemplary and explanatory only and are not restrictive of the invention, as claimed.

DESCRIPTION OF THE PREFERRED EMBODIMENTS

Figure 1:
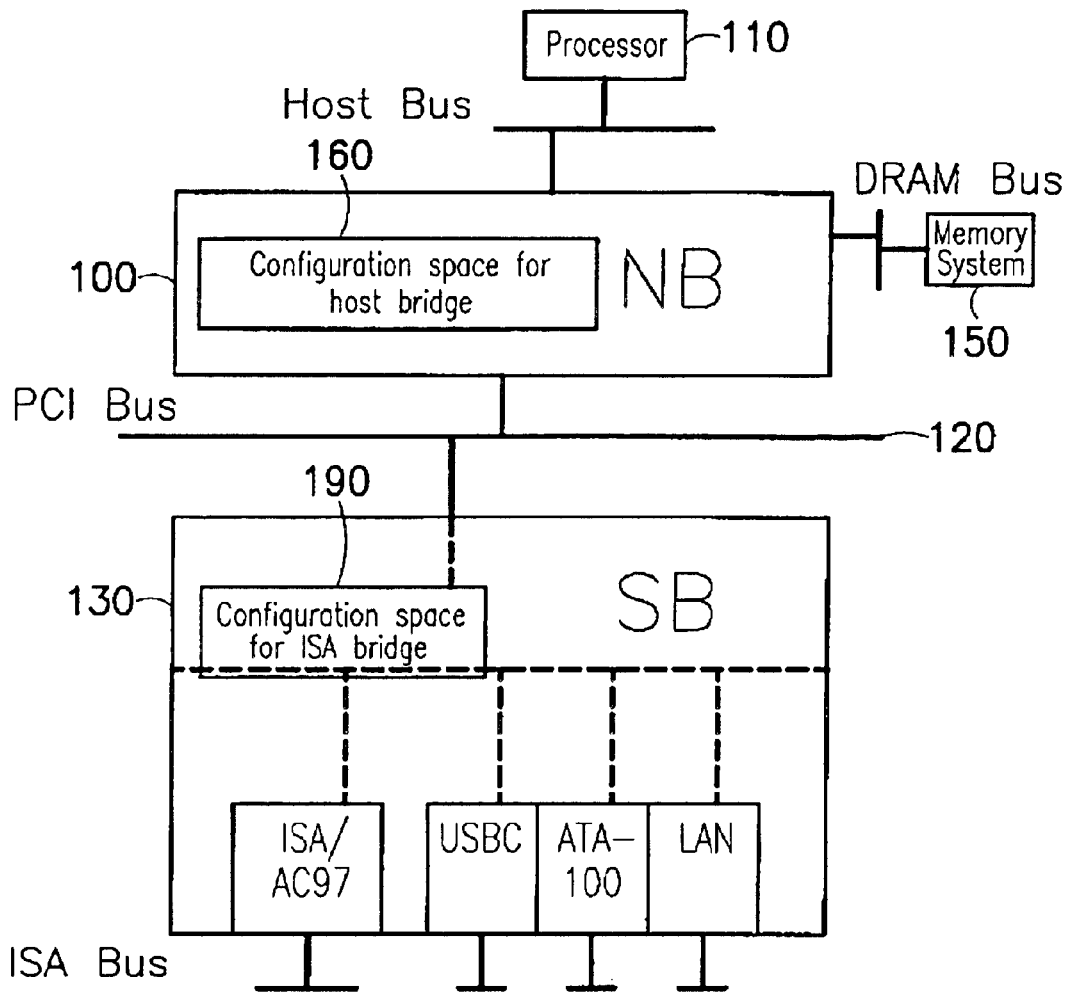
FIG. 1 shows a system structure and the distribution locations of configuration spaces of a PCI bus.
Figure 2:
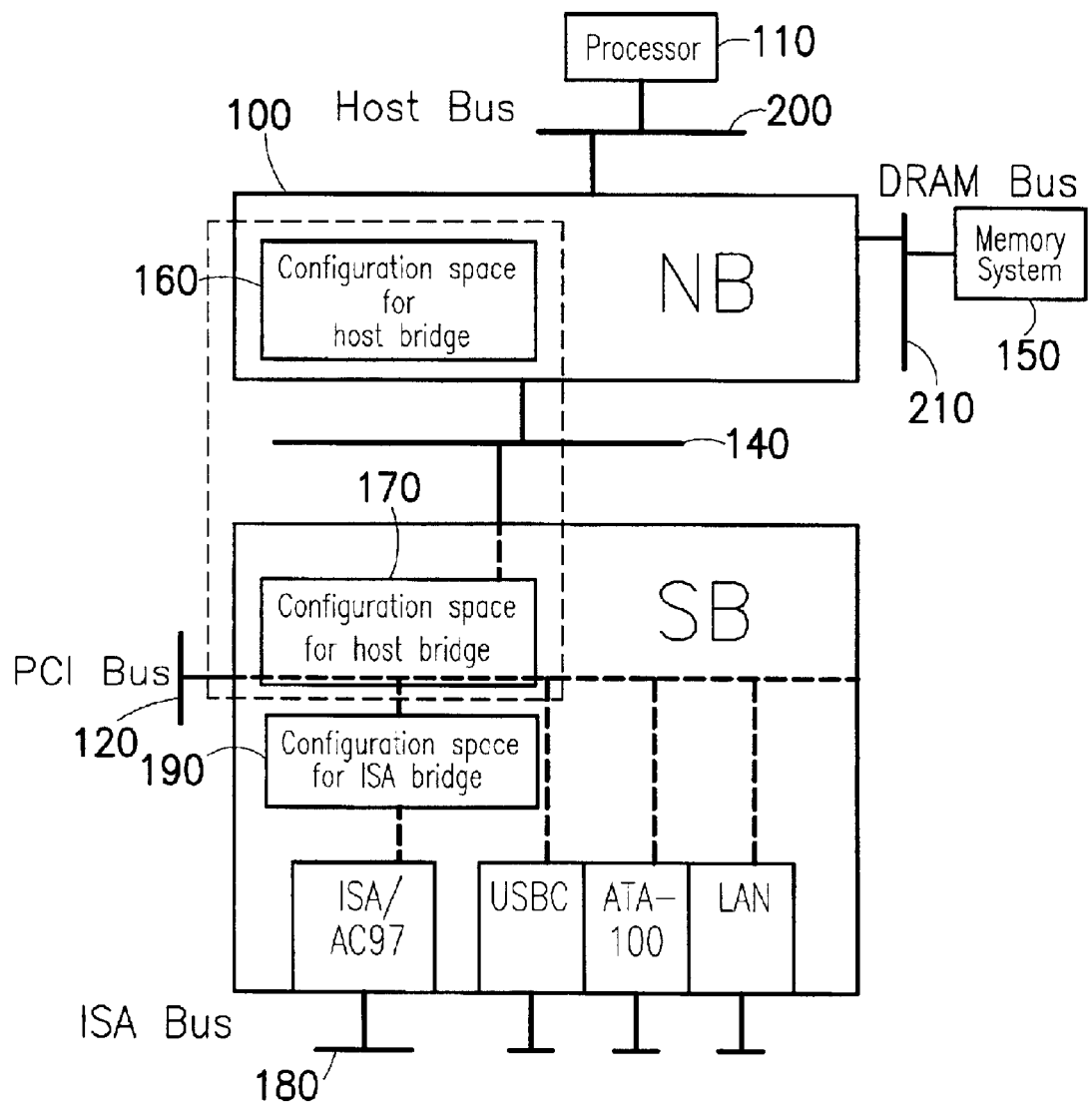
FIG. 2 shows another system structure and the distribution locations of configuration spaces of a PCI bus.

To increase the transmission speed, a high speed private bus is introduced between a south bridge control chip and a north bridge control chip of the advanced computer system. The previous PCI bus with 33 MHz is shifted into the south bridge control chip. In a co-pending U.S. patent applications Ser. Nos. 09/718,811 and 09/735,412, which the inventor of the invention is one of the co-inventors, a high speed private bus is used for the data transmission between the north and south bridge control chips. When the speed of the peripherals of the south bridge control chip is enhanced, the data transmission is not restricted to 33 MHz of the PCI bus since the data can be transmitted via the high speed private bus. FIG. 2 shows a system structure having the private bus and the distribution locations of configuration spaces of a PCI bus. As shown in FIG. 2, the north bridge control chip 100 is responsible for the connection between the microprocessor 110 and the high speed private bus 140. The south bridge control chip 130 is responsible for the connection between the high speed private bus 140 and the PCI bus 120 and other peripherals.

For the substantial structure, this sort of advanced system requires a main connector in the north bridge control chip responsible for the data transmission between the microprocessor and the high speed private bus. An additional connector is also required in the south bridge control chip for the data transmission between the high speed private bus and the PCI bus. The south bridge control chip also comprises an ISA bus connector. Such variation affects the BIOS or the OS system since all the paths from the microprocessor to the PCI bus 120, the ISA bus 180 and other peripherals have to go through the additional connectors in the north and south bridge control chips.

As mentioned above, in the advanced computer system, a high speed private bus is introduced between the north bridge control chip and the south bridge control chip to increase the data transmission speed. The PCI bus 120 is shifted to the south bridge control chip 130. As shown in FIG. 2, a first part of the configuration space for host bridge 160 located in the north bridge control chip 100. A second part of the configuration space for host bridge 170, which originally located in the north bridge control chip, has to be shifted into the south bridge control chip 130. That is, the configuration values of the configuration space for host bridge 170 related to the PCI bus 120 has to be stored in the south bridge control chip. In order to apply to the advanced computer system, some modification of the previous software should be done, but it will cause an extra burden for the development of BIOS or OS.

Figure 3:
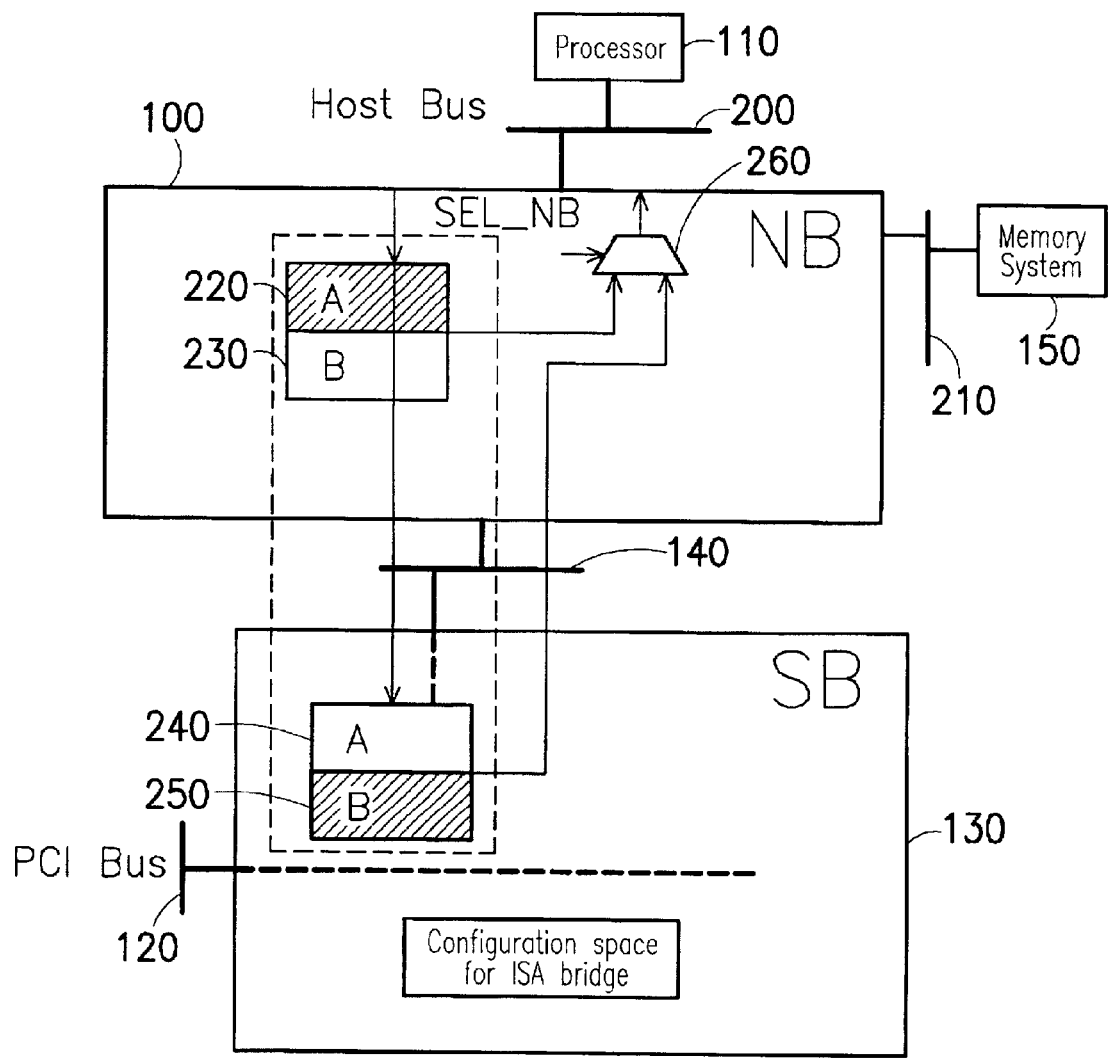
FIG. 3 shows a system structure and the distribution locations of configuration spaces of a PCI bus according to the invention.

FIG. 3 shows a system structure of a PCI bus and the distribution location of the configuration spaces according to the invention. As shown in FIG. 3, a system of dividing the configuration space is provided. The system comprises a microprocessor 110, a host bus 200, a north bridge control chip 100, a high speed private bus 140, a PCI bus 120, a south bridge control chip 130, a memory bus 210, and a memory system 150. The host bus 200 is responsible for the connection between the microprocessor 110 and the north bridge control chip 100. The memory bus 210 is responsible for the connection between the north bridge control chip 100 and the memory system 150. In addition, the newly introduced high speed private bus 140 connects the north and south bridge control chips 100 and 130. Using the south bridge control chip 130, the PCI bus 120 communicates with the host bus 200 or the memory bus 210 via the high speed private bus 140.

In the invention, the north bridge control chip 100 comprises an actual configuration space for host bridge A (220) to store the configuration values, which relates to the microprocessor 110 and the memory system 150, in the registers. The south bridge control chip 130 comprises an actual configuration space for host bridge B (250) to store the configuration values, which relates to the PCI bus, in the registers. In addition, there exists a configuration space for host bridge B (230) of the north bridge control chip 100 as a duplicated copy of the configuration space for host bridge B 250. The south bridge control chip 130 also has configuration space for host bridge A (240) as a duplicated copy of the configuration space for host bridge A (220). Furthermore, the duplicated copy of the configuration spaces for host bridge B (230) and A (240) are empty configuration spaces. The north bridge control chip 100 further comprises a selector 260 selected by a SEL_NB signal. To respond the request from the microprocessor 110, the selector 260 selects either the configuration space for host bridge A (220) or the configuration space for host bridge B (250).

That is, when the microprocessor 110 is performing a read operation cycles on the target addressed to the configuration space for host bridge A (220), the real output data is selected from the actual configuration space for host bridge A (220) even though the configuration space for host bridge A (240) outputs a read data via the private bus. When the microprocessor 110 is performing a read operation cycles on the target addressed to the configuration space for host bridge B (250), the real output data is selected from the actual configuration space for host bridge B (250) via the private bus even though the configuration space for host bridge B (230) outputs a read data.

When the microprocessor 110 is performing a write operation on the configuration space for host bridge A (220), the north bridge control chip 100 also activates a write request to the south bridge control chip 130. However, such data is not really stored in the south bridge control chip 130, but is only stored in the configuration space for host bridge A (240), an empty configuration space. Similarly, if the data to be written by the microprocessor 110 is to be stored in the configuration space for host bridge B (250), the north bridge control chip 100 also writes the data into the configuration space for host bridge B (230), an empty configuration space. Meanwhile, the south bridge control chip 130 is requested to save the data into the configuration space for host bridge B (250) thereof.

That is, when the microprocessor 110 is performing a write operation cycle related to the configuration storage space, the write operation cycle is sent to both the north bridge control chip 100 and the south bridge control chip 130. When the target for the write operation cycle is addressed to the configuration space for host bridge A (220), the data is written into the actual configuration space for host bridge A (220) only. When the target for the write operation cycle is addressed to the configuration space for host bridge B (250), the data is written into the actual configuration space for host bridge B (250) only.

Thus, from the developers of BIOS or OS system point of view, the configuration space is equivalently undivided. The original software program can be applied without being modified. In fact, the configuration values are stored in registers of the north and south bridge control chips 100 and 130 according to specific requirements, respectively. As a result, a high speed private bus 140 can be used between the north and south bridge control chips to enhance the transmission speed.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A method of dividing a configuration space, applied to a computer system comprising a microprocessor, a north bridge control chip, a first bus, a south bridge control chip, and a second bus, wherein the first bus is coupled to the north bridge control chip and south bridge control chip and the south bridge chip is further coupled to the second bus, the method comprising:

providing a first actual configuration space in the north bridge control chip to store a plurality of configuration values relating to the a plurality of devices connected to the north bridge control chip;

providing a second actual configuration storage space in the south bridge control chip to store a plurality of configuration values relating to the second bus; and transmitting a write operation cycle to both the north bridge control chip and the south bridge control chip when the microprocessor is performing the write operation cycle related to the configuration spaces, wherein:

the first actual configuration space is written to only when the write operation cycle is addressed to the first actual configuration space; and the second actual configuration space is written to only when the write operation cycle is addressed to the second configuration storage space;

when the microprocessor is performing a read operation cycle related to the configuration spaces, selecting data read from the first actual configuration space only when the read operation cycle is addressed at the first actual configuration space; and selecting data read from the second actual configuration space only when the read operation cycle is addressed at the second actual configuration storage space.

2. The method according to claim 1, further comprising:

providing a selector in the north bridge control chip, to select data read from either the first or the second actual configuration space when the microprocessor is performing the read operation cycle related to the configuration space.

3. The method according to claim 1, wherein the configuration values of the configuration space in the north bridge control chip comprises a plurality of settings of the microprocessor and a memory system.

4. The method according to claim 1, wherein the first bus comprises a high speed private bus.

5. The method according to claim 1, wherein the second bus comprises a PCI bus.

6. A method of dividing a configuration space, applied to a computer system comprising a microprocessor, a host bus, a north bridge control chip, a high speed private bus, a PCI bus, a south bridge control chip, a memory bus, and a memory system, wherein the host bus is coupled to the microprocessor and the north bridge control chip, the memory bus is coupled to the north bridge control chip and the memory system, the high speed private bus is coupled to the north and the south bridge control chips, and the south bridge control chip is coupled to the PCI bus, the method comprising:

providing a configuration storage space located in the north bridge control chip, wherein the configuration space includes a first actual configuration space to store a plurality of configuration values relating to the microprocessor and the memory system and a first duplicated copy of configuration space;

providing a configuration space located in the south bridge control chip, wherein the configuration space includes a second actual configuration storage space actual to store a plurality of configuration values relating to the PCI bus and a second duplicated copy of configuration space;

providing a selector, comprising a first input terminal and a second input terminal, wherein the first input terminal and the second terminal are coupled respectively to the configuration spaces in the north bridge control chip and the south bridge control chip, the selector further comprising an output terminal coupled to the main bus;

transmitting a write request to the second duplicated copy of configuration space when the microprocessor is performing the write operation on the first actual configuration space;

transmitting a write request to the first duplicated copy of configuration space when the microprocessor is performing the write operation on the second actual configuration space;

outputting the first input terminal of the selector to the output terminal thereof when the processor is performing a read operation on data stored in the first actual configuration space; and outputting the second input terminal of the selector to the output terminal thereof when the processor is performing a read operation on data stored in the second actual configuration space.

7. A system of dividing a configuration space, comprising:

a microprocessor;

a north bridge control chip, coupled to the microprocessor;

a first bus, coupled to the north bridge control chip;

a south bridge control chip, coupled to the first bus; and a second bus, coupled to the south bridge control chip; wherein:

the north bridge control chip comprises a first actual configuration space to store a plurality of configuration values relating to a plurality of device connected to the north bridge control chip, and the south bridge control chip comprises a second actual configuration space to store a plurality of configuration values relating to the second bus;

a write operation cycle is output to both the north and south bridge control chips when the microprocessor is performing a write operation cycle related to the configuration storage spaces;

only the first actual configuration space is written when the write operation cycle is addressed to the first actual configuration space; and only the second actual configuration space is written when the write operation cycle is addressed to the second actual configuration space;

when the microprocessor is performing a read operation cycle related to the configuration space:

data read from the first actual configuration space is selected when the read operation cycle is addressed to the first actual configuration space; and data read from the second actual configuration space is selected when the read operation cycle is addressed to the second actual configuration space.

8. The system according to claim 7, wherein the north bridge control chip comprises a selector to select the data read from either the first actual configuration space or the second actual configuration space when the microprocessor is performing the read operation cycle.

9. The system according to claim 7, wherein the configuration values of the first actual configuration space in the north bridge control chip comprises a plurality of settings of the microprocessor and a memory system.

10. The system according to claim 7, wherein the first bus comprises a high speed private bus.

11. The system according to claim 7, wherein the second bus comprises a PCI bus.

12. The system according to claim 7, wherein the north bridge control chip further comprises a first duplicated copy of configuration storage space mapping to the second actual configuration space.

13. The system according to claim 7, wherein the south bridge control chip further comprises a second duplicated copy of configuration space mapping to the first actual configuration space.

* * * * *